United States Patent [19]

Takami et al.

[11] 4,374,942

[45] Feb. 22, 1983

[54] POWDER HAVING A NEGATIVE COEFFICIENT OF LINEAR THERMAL EXPANSION AND A COMPOSITION CONTAINING THE SAME

[75] Inventors: Akio Takami; Kazuo Kondo, both of Aichi, Japan

[73] Assignee: NGK Spark Plug Co., Ltd., Aichi, Japan

[21] Appl. No.: 386,811

[22] Filed: Jun. 9, 1982

Related U.S. Application Data

[62] Division of Ser. No. 301,860, Sep. 14, 1981, which is a division of Ser. No. 77,810, Sep. 21, 1979, Pat. No. 4,310,598.

[30] Foreign Application Priority Data

Sep. 21, 1978 [JP] Japan .................................. 53-116318
Jan. 5, 1979 [JP] Japan .......................................... 54-41

[51] Int. Cl.³ ........................ B32B 15/16; B32B 17/06; B32B 27/20

[52] U.S. Cl. .................................... 523/210; 523/216; 523/458; 523/459; 524/413; 524/430; 524/588; 106/308 M

[58] Field of Search ............... 523/216, 210, 458, 459; 524/588, 413, 430; 106/308 M, 308 B

[56] References Cited

U.S. PATENT DOCUMENTS

| | | | |
|---|---|---|---|
| 3,047,409 | 7/1962 | Stayter et al. | 428/406 |
| 4,025,667 | 5/1977 | Tomb et al. | 428/406 |
| 4,042,550 | 8/1977 | Tuller et al. | 523/458 |
| 4,134,776 | 1/1979 | Rieger et al. | 523/516 |

*Primary Examiner*—Mark Bell
*Attorney, Agent, or Firm*—Sughrue, Mion, Zinn, Macpeak & Seas

[57] ABSTRACT

A powder having a negative coefficient of linear thermal expansion and sealing compositions containing the same are disclosed wherein the powder is a β-eucryptite particle having on the surface thereof a layer of tin oxide, titanium oxide, and/or zirconium oxide.

6 Claims, No Drawings

POWDER HAVING A NEGATIVE COEFFICIENT OF LINEAR THERMAL EXPANSION AND A COMPOSITION CONTAINING THE SAME

CROSS REFERENCE TO RELATED APPLICATIONS

This application is a divisional application of Ser. No. 301,860, filed Sept. 14, 1981, which in turn is a divisional application of Ser. No. 77,810, filed Sept. 21, 1979, now U.S. Pat. No. 4,310,598.

BACKGROUND OF THE INVENTION

1. Field of the Invention

The present invention relates to a powdery material having a negative coefficient of linear thermal expansion and an improved low expansible sealing composition containing the same. More particularly, the present invention relates to a composition for sealing IC packages, etc.

2. Description of the Prior Art

Conventional sealing compositions comprising soldering glass as the main component are used for sealing, bonding or coating previously molded articles, glassware, metal elements, ceramics, semiconductor elements or portions of semiconductive components, etc. The properties required of sealing compositions used for this purpose are low expansivity and high electrical insulating property, ability to form a firm seal and suitable fluidity. For example, the sealing glass used for sealing IC packages or display tubes or for furnace sealing of Braun tubes must have a coefficient of linear thermal expansion lower than that of $Al_2O_3$ and higher than that of Kovar, a glass transition point of 400° C. or less and a good electrical insulating property, because it is used to seal ceramic base plates comprising a low expansible metal such as Kovar, and $Al_2O_3$ as main components. However, the low melting glasses generally used for this purpose have a high coefficient of linear thermal expansion.

In order to overcome this fault, it has been attempted to carry out a process for forming crystals of lead titanate or $\beta$-eucryptite by heat treatment of, for example, a $Li_2O$-$Al_2O_3$-$SiO$ system or a $PbO$-$B_2O_3$-$TiO_2$ system crystalline glass. However, in the former glass, the electrical insulating property of the seal deteriorates due to the presence of Li ions and the properties of the coated or sealed semiconductor elements deteriorate upon diffusion of Li ions. On the other hand, with the latter glass the sealing treatment requires a comparatively long period of time due to its high sealing temperature.

In addition, a low expansible filler such as zircon, quartz, $\beta$-eucryptite, etc., has been added to a powder of a $PbO$-$B_2O_3$-$SiO_2$ system or a $PbO$-$ZnO$-$B_2O_3$ system crystalline glass in order to reduce the coefficient of linear thermal expansion as disclosed in U.S. Pat. Nos. 3,250,631 and 3,258,350. Taking zircon as an example, it has good acid resistance, but large additions are necessary to reduce the coefficient of linear thermal expansion to a desirable level since it has a coefficient of linear thermal expansion of about $45 \times 10^{-7}$/°C. and, consequently this makes the sealing temperature high. As another example in addition to the above described fillers, lead titanate has been used to reduce the coefficient of expansion. Lead titanate has a coefficient of linear thermal expansion of $-60 \times 10^{-7}$/°C. and exhibits negative expansion. The fluidity of the glass to which it is added is good but it has a high dielectric constant.

$\beta$-Eucryptite has a coefficient of linear thermal expansion as low as $-120 \times 10^{-7}$/°C. and, consequently, it has an effect of reducing the coefficient of linear thermal expansion when used in a small amount. Further it has a low dielectric constant, but when added to glass, it dissolves in the glass and deteriorates the fluidity. Furthermore, the $Li_2O$ contained in $\beta$-eucryptite diffuses into the glass and deteriorates its electrical insulating property.

SUMMARY OF THE INVENTION

An object of the present invention is to remove the above described shortcomings of the prior art and to provide a novel powdery material (filler) having a negative coefficient of linear thermal expansion and a novel sealing composition containing this filler.

The powdery material according to the present invention having a negative coefficient of linear thermal expansion comprises a $\beta$-eucryptite powder on the surface of which is a layer of tin oxide, titanium oxide and/or zirconium oxide about 1 micron or less thick. Further, the low expansible sealing composition according to the present invention comprises about 30% by weight or less of the above described powder having a negative coefficient of linear thermal expansion and the balance of a low melting glass. In another embodiment of this invention low expansible sealing compositions or composite materials are obtained using known synthetic resins instead of the low melting glass.

DETAILED DESCRIPTION OF THE INVENTION

The powdery material having a negative coefficient of linear thermal expansion according to the present invention is obtained by forming a layer of $SnO_2$, $TiO_2$, and/or $ZrO_2$ on a $\beta$-eucryptite crystal powder of a suitable particle size. The layer should be about $1\mu$ or less thick and is preferably about 0.2 to $0.8\mu$ thick. The $\beta$-eucryptite crystal powder preferably has a particle size of about 5 to $25\mu$ when used as a filler for low expansible sealing glass as well as when used as a filler for synthetic resin sealing agents, however, sizes outside of this range are also suitable and can be suitably selected for other uses.

Formation of the layer of $SnO_2$, $TiO_2$ and/or $ZrO_2$ can be carried out by introducing an organic compound of Sn, Ti or Zr to the surface of particles of the $\beta$-eucryptite powder and decomposing it to the oxide. An $SnO_2$ coating layer can be formed using tin octylate or dimethyl tin dichloride as the tin organic compound. In the former case, after dispersing the $\beta$-eucryptite powder into a tin octylate solution and stirring the mixture whereupon the tin compound adheres to the surface of the eucryptite, the temperature of the mixture is raised at a rate of about 200° C./hr and the $\beta$-eucryptite powder thus treated is subjected to heat treatment at about 600° C. for about 30 minutes. In the latter case, the $\beta$-eucryptite powder is brought into contact with a gas which is produced by thermal decomposition of dimethyl tin dichloride at about 600° C. for about 30 minutes with stirring.

Formation of the $TiO_2$ coating layer is carried out using as the Ti organic compound isopropyl orthotitanate or titanium isopropoxide. In the former case, the $\beta$-eucryptite powder is dispersed in the isopropyl orthotitanate solution with stirring and then heat treated. In the latter case, the $\beta$-eucryptite powder is dispersed in the titanium isopropoxide solution with stirring, steam is introduced into the solution to hydrolyze the titanium isopropoxide thereby improving the quality of the coating formed, and the β-eucryptite powder thus treated is subjected to heat treatment at about 600° C. In the present invention, other known titanium organic compounds such as acylates or titanium chelates may be used. In such cases, formation of the oxide coating can be carried out by, for example, thermal decomposition, reaction between the β-eucryptite powder and the organic compound, CVD (Chemical Vapor Deposition), chemical plating, etc.

As the Zr organic compound for formation of the $ZrO_2$ coating layer, Zr n-propoxide is used. The β-eucryptite powder is dispersed in the Zr n-propoxide solution with stirring and steam is introduced into the solution to hydrolyze the Zr n-propoxide. The β-eucryptite powder thus treated is then subjected to heat treatment at about 600° C. to form the $ZrO_2$ coating layer. Other organic zirconates, acylates and chelates may also be used.

Generally, as $SnO_2$, $TiO_2$ or $ZrO_2$ layer formed as described above is provided alone. But a multilayer structure or a mixed layer may be formed by a combination of the above techniques.

The β-eucryptite powder in which the $SnO_2$, $TiO_2$ and/or $ZrO_2$ layers is 1μ or less thick has a coefficient of expansion near the negative coefficient of expansion of β-eucryptite. When this powder is added to a low melting sealing glass in the amount of about 30% by weight or less and preferably about 5 to 25% by weight, the coefficient of linear thermal expansion of the glass composition decreases remarkably. The $SnO_2$, $TiO_2$ or $ZrO_2$ layer is stable in the glass and effectively prevents diffusion of Li ions in the β-eucryptite, and it functions as a separator layer. Consequently, the insulation resistance of the sealing composition is maintained at a high value. Particularly, in a bias test (65° C., 95% RH, 30 V, 100 hrs), this value is $10^4$ or more times higher than that of a composition in which β-eucryptite without an oxide coating is used.

Further, the $TiO_2$ layer reacts with the PbO in a $PbO-B_2O_3$ system glass to form a very small amount of $PbTiO_3$ so as not to increase the dielectric constant. This $PbTiO_3$ is believed to contribute to good thermal expansion and fluidity. From the viewpoint of fluidity, it is preferred that the $TiO_2$ layer is about 0.8μ or less thick and a thickness of about 0.4 to 0.8μ is preferred considering the insulating property.

The low melting sealing glass mixed with the β-eucryptite powder in the present invention is a known glass in which the total amount of PbO and $B_2O_3$ is about 70% by weight or more. In addition, a known sealing glass such as described in Japanese Patent Publication No. 4525/74 can be used as long as it satisfies the following condition. That is, the glass has a coefficient of linear expansion at 30° to 250° C. of about $80 \times 10^{-7}$ to $130 \times 10^{-7}°C.^{-1}$ and generally has a glass transition point of about 250° to 400° C.

A preferred example of the above described PbO glass is composed of about 75 to 82 wt % PbO, about 6.5 to 12 wt % $B_2O_3$, about 7 to 14 wt % ZnO, about 1.5 to 3.0 wt % $SiO_2$ and about 0 to 3 wt % $Al_2O_3$.

The synthetic resins used in accordance with another embodiment of the present invention for plastic packages, etc., include bisphenol type epoxy resins and silicone resins, etc. These resins must be heat resistant to a temperature of about 100° C. or more. When the filler is added to these resins, it improves mold-releasing property, heat resistance, molding characteristics and economizes the cost of raw materials (because the resins are expensive). The amount of the filler added is generally about 50% by weight or less and preferably about 10 to 50% by weight in the case of the use of synthetic resins.

In the following, preferred examples of the present invention are described.

EXAMPLE 1

Raw materials $Li_2CO_3$, $Al_2O_3$ and $SiO_2$ were mixed so that the molar ratio of $Li_2O:Al_2O_3:SiO_2$ was 1:1:2. After the mixture was melted in an aluminum pot by keeping the temperature at 1,400° C. for 3 hours, it was cooled to make a frit. The frit was crystallized by heat treatment again at 900° C. for 5 hours to produce a crystallized β-eucryptite product and milled with a ball mill to produce a β-eucryptite powder having an average particle size of about 10 microns. Then, isopropyl orthotitanate was mixed with the above described β-eucryptite powder in steam to hydrolyze it, by which titanic acid was deposited on the surface of the β-eucryptite powder. The powder was then subjected to heat treatment at 600° C. for 1 hour to form a $TiO_2$ coating layer. The thickness of the coating layer is shown in Table 1. Then, the $TiO_2$ coated powder was mixed in an amount of 20% by weight with a low melting glass composed of 78 wt % PbO, 16 wt % $B_2O_3$, 3 wt % $Al_2O_3$ and 3 wt % $SiO_2$ (Tg: 305° C., α: $113 \times 10^{-7}°C.^{-1}$), and the mixture was heated until fluid. After cooling, various characteristics were measured. The results are shown in Table 1.

To obtain a particularly thin $TiO_2$ layer, isopropyl orthotitanate was heated to 80° C. and vaporized or atomized using $N_2$ gas as a carrier, followed by contacting the β-eucryptite powder while mixing with steam.

EXAMPLE 2

Zr n-propoxide was mixed with a β-eucryptite powder (particle size: about 10μ) prepared in the same manner as in Example 1 with stirring to hydrolyze the propoxide. The powder was then subjected to heat treatment at 600° C. for 1 hour to form a $ZrO_2$ coating layer. The resulting $ZrO_2$ coated powder was mixed in an amount of 20% by weight with the same glass as that in Example 1 and heated until fluid. After cooling, various chracteristics were measured. The results are shown in Table 2.

EXAMPLE 3

Tin octylate was mixed with a β-eucryptite powder (particle size: about 10μ) prepared in the same manner as in Example 1, the temperature was raised at 200° C./hr and the mixture was subjected to heat treatment at 600° C. for 30 minutes to form an $SnO_2$ coating layer. The resulting $SnO_2$ coated powder was mixed in an amount of 20% by weight with the same glass as in Example 1 and heated until fluid. After cooling, various characteristics were measured. The results are shown in Table 3.

TABLE 1

| Sample No. | 1 (Comparison) | 2 (invention) | 3 (invention) | 4 (invention) | 5 (invention) |
|---|---|---|---|---|---|
| $TiO_2$ Layer Thickness ($\mu$) (1) | 0 | 0.2 | 0.4 | 0.8 | 1.0 |
| Sealing Composition Coefficient of Linear Expansion $\times 10^{-7}$ °C.$^{-1}$ (30 to 250° C.) | 76.4 | 67.0 | 59.0 | 42.0 | 60.0 |
| Resistance ($\Omega$) (2) | | | | | |
| Initial Stage (3) | $>10^{12}$ | $>10^{12}$ | $>10^{12}$ | $>10^{12}$ | $>10^{12}$ |
| Bias Test (4) | $5 \times 10^6 \sim 10^8$ | $1 \times 10^{10} \sim 10^{12}$ | $>10^{12}$ | $>10^{12}$ | $>10^{12}$ |
| Fluidity (diameter of flow button (mm)) (5) | 28.0 | 32.5 | 33.2 | 33.8 | 30.8 |

Note
(1) Measurement by scanning electron microscope.
(2) Two rectangular ceramic sheets of 13 × 30.5 mm having a 2 mm thickness placed at interval of 1 mm were sealed with the sealing composition, and lead terminals were buried in an edge thereof at intervals of 0.4 mm. The resistance between the buried adjacent lead wires was measured.
(3) Resistance between lead wires after a lapse of 1 minute after applying 100 V DC measured by a super-insulation tester.
(4) Lead wires were plated with Sn and 10 V DC was applied therebetween at 60° C. of temperature and 95% of humidity. After a lapse of 200 hours, resistance between the lead wires was measured.
(5) After a cylindrical press molding having 12 mm in diameter and 7.7 mm in height was allowed to stand at 500° C. at atmospheric temperature for 1 hour, it was cooled, the diameter was measured.

TABLE 2

| Sample No. | 1 (Comparison) | 2 (Invention) | 3 (Invention) | 4 (Invention) | 5 (Invention) |
|---|---|---|---|---|---|
| $ZrO_2$ Layer Thickness ($\mu$) (1) | 0 | 0.2 | 0.4 | 0.8 | 1.0 |
| Sealing Composition Coefficient of Linear Expansion $\times 10^{-7}$ °C.$^{-1}$ (30 to 250° C.) | 76.4 | 69.0 | 61.0 | 45.0 | 55.0 |
| Resistance ($\Omega$) (2) | | | | | |
| Initial Stage (3) | $>10^{12}$ | $>10^{12}$ | $>10^{12}$ | $>10^{12}$ | $>10^{12}$ |
| Bias Test (4) | $5 \times 10^6 \sim 10^8$ | $1 \times 10^{10} \sim 10^{12}$ | $>10^{12}$ | $>10^{12}$ | $>10^{12}$ |
| Fluidity (diameter of flow button (mm)) (5) | 28.0 | 32.5 | 33.2 | 33.8 | 30.8 |

Note (1)-(5): Refer to Table 1.

TABLE 3

| Sample No. | 1 (Composition) | 2 (Invention) | 3 (Invention) | 4 (Invention) | 5 (Invention) |
|---|---|---|---|---|---|
| Tin Oxide Layer Thickness ($\mu$) (1) | 0 | 0.2 | 0.4 | 0.8 | 1.0 |
| Sealing Composition Coefficient of Linear Thermal Expansion $\times 10^{-7}$ °C.$^{-1}$ (30 to 250° C.) | 76.4 | 68.0 | 60.0 | 43.0 | 40.0 |
| Resistance ($\Omega$) (2) | | | | | |
| Initial State (3) | $>10^{12}$ | $>10^{12}$ | $>10^{12}$ | $>10^{12}$ | $>10^{12}$ |
| Bias Test (4) | $5 \times 10^6 \sim 10^8$ | $5 \times 10^9 \sim 10^{12}$ | $>10^{12}$ | $>10^{12}$ | $>10^{12}$ |
| Fluidity Test (diameter of flow button (mm)) (5) | 28.0 | 31.9 | 32.5 | 33.5 | 30.8 |

Note (1)-(5): Refer to Table 1.

As described above, the powdery material of the present invention having a negative coefficient of linear thermal expansion is very useful in a low expansible sealing composition (or sealing agent), for molding or sealing IC packages. Namely, in the case of sealing for IC packages, it has good compatibility with Kovar, ceramic parts and silicon elements and it prevents diffusion of Li ions in β-eucryptite into the glass, by which the insulation resistance between lead wires does not deteriorate under a bias state, and the fluidity of the glass is improved. Accordingly, β-eucryptite which is difficult to practically use hitherto is effectively utilized as a negatively expansible filler in the present invention. Since this filler has a low dielectric constant as compared with, for example, $PbTiO_3$, it is also possible to reduce the dielectric constant of the whole sealing composition.

While the invention has been described in detail and with reference to specific embodiments thereof, it will be apparent to one skilled in the art that various changes and modifications can be made therein without departing from the spirit and scope thereof.

What is claimed is:

1. A sealing composition having a low expansivity which consisting essentially of 50% by weight or less of a β-eucryptite particle having on the surface thereof a single layer of or multiple layers of a member selected from the group consisting of tin oxide, titanium oxide, zirconium oxide and a mixture of two or more of said oxides, said oxides being present in a thickness of about 1$\mu$ or less; and a resin.

2. The sealing composition of claim 1, wherein said resin is a bisphenol type epoxy resin or a silicone resin.

3. The sealing composition of claim 1, wherein said oxide on the surface of said powder has a thickness of about 0.2 to 0.8$\mu$.

4. The sealing composition of claim 1, wherein said oxide is tin oxide.

5. The sealing composition of claim 1, wherien said oxide is titanium oxide.

6. The sealing composition of claim 1, wherein said oxide is zirconium oxide.

* * * * *